United States Patent [19]

McKee

[11] 4,058,465
[45] Nov. 15, 1977

[54] FILTER FOR FISH POND
[75] Inventor: Paul McKee, Grass Valley, Calif.
[73] Assignee: Lois Enebrad, Stockton, Calif.
[21] Appl. No.: 732,357
[22] Filed: Oct. 14, 1976
[51] Int. Cl.$^2$ .............................................. B01D 25/00
[52] U.S. Cl. ................................... 210/356; 210/460; 210/488
[58] Field of Search ............... 210/169, 350, 356, 460, 210/457, 488

[56] References Cited
U.S. PATENT DOCUMENTS

| | | | |
|---|---|---|---|
| 1,758,412 | 5/1930 | Sheppy | 210/457 X |
| 2,837,032 | 6/1958 | Horsting, Sr. | 210/356 X |
| 3,160,588 | 12/1964 | Alarie | 210/488 X |
| 3,947,362 | 3/1976 | Etani | 210/460 X |

Primary Examiner—Frank A. Spear, Jr.
Assistant Examiner—Richard W. Burks
Attorney, Agent, or Firm—Alvin E. Hendricson

[57] ABSTRACT

A filter structure includes a central perforated cylinder surrounded by flexible separable filter units of self-standing porous material through which water is drawn by a pump connected to a cylinder for filtering algae and the like from the water. The central cylinder is apertured at the junction of separate filter units so that water may be drawn through the structure even though the filter units become clogged with filtered material.

3 Claims, 4 Drawing Figures

FILTER FOR FISH POND

BACKGROUND OF INVENTION

Devices for mechanically removing particles from liquid are employed in a wide variety of fields and there have been developed innumerable types of filters for this purpose. Commonly, filters are formed by some sort of apertured container filled with a filtering material that defines a large plurality of restricted passages therethrough. Filter materials vary from diatomaceous earth to paper and all serve to mechanically strain or filter particles from a fluid flowing therethrough.

Filters for liquids are normally inserted in or employed in fluid flow systems wherein a pump forces the fluid through the system and many of these applications employ a suction pump so that the fluid is clean before passage through the pump in order to prevent fouling of the pump. It is conventional to employ centrifugal pumps in fluid flow systems; however, in situations wherein filters are provided ahead of centrifugal pumps, it is important to ensure a continuous flow of fluid through the filter to the pump inlet in order to prevent pump runaway and failure. Industrial fluid flow systems operating with centrifugal pumps incorporate appropriate bypass systems to guard against loss of inlet pressure; however, many other systems of relatively low cost and lesser complexity merely depend upon sufficient fluid flow through input filters. This poses a possibility of pump damage under circumstances wherein filter maintenance may be inadequate.

Normal filters are formed with filtering materials inside an apertured container, as noted above. This in itself is disadvantageous for a number of reasons. First, the conditions of the filtering material are not readily visible and thus the material may become clogged or choked with particles or the like without ready notice. Second, cleaning or replacement of the filtering material requires opening a container and removal of the filtering material.

The present invention provides a very simple liquid filter having the filtering material on the exterior thereof for ready visual inspection and easy removal, cleaning and replacement. Additionally, the filter structure hereof readily admits a fluid flow therethrough under conditions of partial or complete clogging of the filtering material.

SUMMARY OF INVENTION

The present invention provides a filtering device of very simple construction for minimizing cost of manufacture and difficulty of servicing while maximizing reliability.

Structurally, the present invention includes a central pipe or tube having longitudinally spaced lateral apertures therethrough which is closed at one end and is adapted for connection at the other end to the inlet of a recycling pump. About the apertured pipe hereof there is disposed a plurality of centrally apertured pieces or blocks of filtering material. These filtering pieces or units are preferably formed of a dimensionally stable open cellular flexible material through which a liquid such as water may be drawn by the suction of a pump connected to the filter, as noted above. These filtering pieces are disposed in contiguous relation about the central apertured pipe with the adjacent edges of at least two of such pieces with a pump aperture. Means are also provided for securing the filtering pieces in the aforementioned position upon the central apertured pipe.

The filter structure of the present invention provides for the drawing of a liquid therethrough even under circumstances wherein the filtering pieces may become clogged by extended filtering action. The physical composition of the filtering medium hereof and physical placement of the pieces thereof admits of the passage of liquid between the pieces into apertures of the central pipe of the invention even though the filtering medium is clogged. This capability of the present invention commends use of the present invention with centrifugal pumps which are normally employed in many liquid recycling systems such as fish ponds and the like. It is well known that centrifugal pumps require flow of liquid therethrough to prevent destruction and the filter structure of the present invention guarantees such flow under normal applications of the invention wherein a pool or other adequate supply of liquid is available for filtering. In other words, the filter of the present invention will not in itself cut off fluid flow even though the filter may be clogged through failure of maintenance.

The filter structure of the present invention is particularly adapted for cleaning of the filtering material thereof. This is also highly advantageous, as is the substantially indestructible nature of the filtering material, so that the filter hereof is extremely long-lived. It is further noted that the present invention is particularly advantageous for use in a fish pond or the like to filter algae from the water, inasmuch as fish or plants in the pond cannot tolerate algae-killing chemicals. Thus the invention is actually more effective than other filters.

DESCRIPTION OF FIGURES

The present invention is illustrated with respect to a single preferred embodiment thereof in the accompanying drawings, wherein.

DESCRIPTION OF PREFERRED EMBODIMENT

Figure 1:
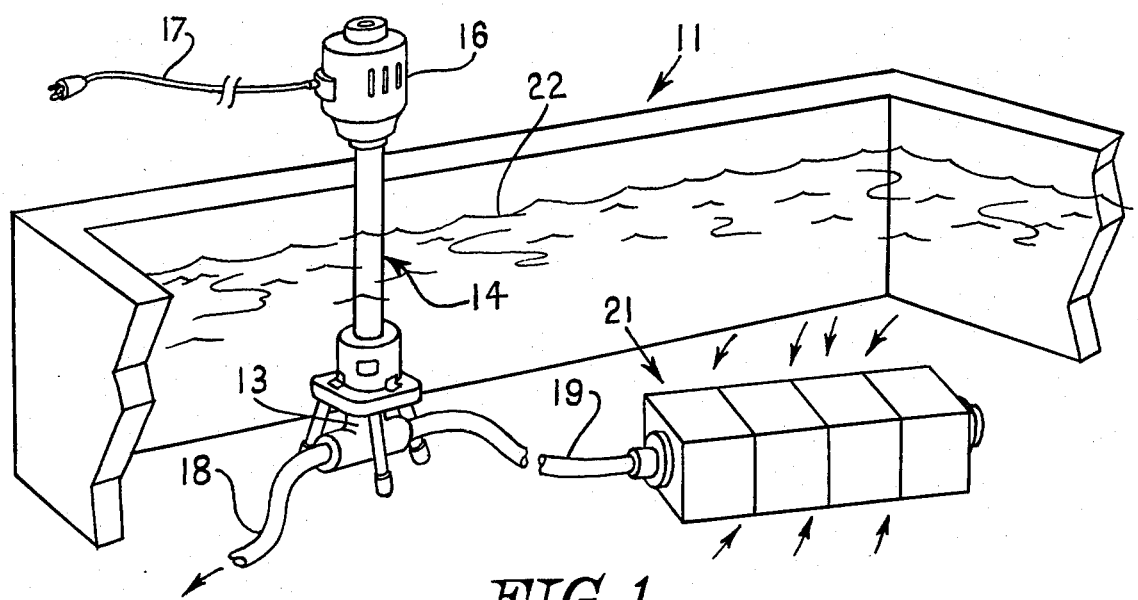
FIG. 1 is a pictorial perspective view of the filter of the present invention connected to a pump in a fish pond.

The filter structure of the present invention may be employed in a variety of different applications; however, the invention is herein illustrated and described in connection with the filtering of water in a fish pond. Referring to FIG. 1 of the drawings, there will be seen to be shown in part the walls or sides 11 of a fish pond 12 wherein a filter pump 13 is disposed. The pump 13 is connected through drive means 14 to an electric motor 16 disposed above the water level of the pond and having an electric cord 17 extending therefrom for attachment to an electrical outlet to energize the motor.

The pump 13 may have a hose or the like 18 connected to the outlet thereof and the pump inlet or suction is connected as by a hose or pipe 19 to the filtering device 21 of the present invention. The filtering device is disposed beneath the level of liquid such as water 22 to be filtered and may, for example, lie in the bottom of the pool 12. In the present example water is drawn through the filter 21 by the pump 13 for removal of physical impurities therein such as algae which grow and propagate in the fish pond.

Figure 2:
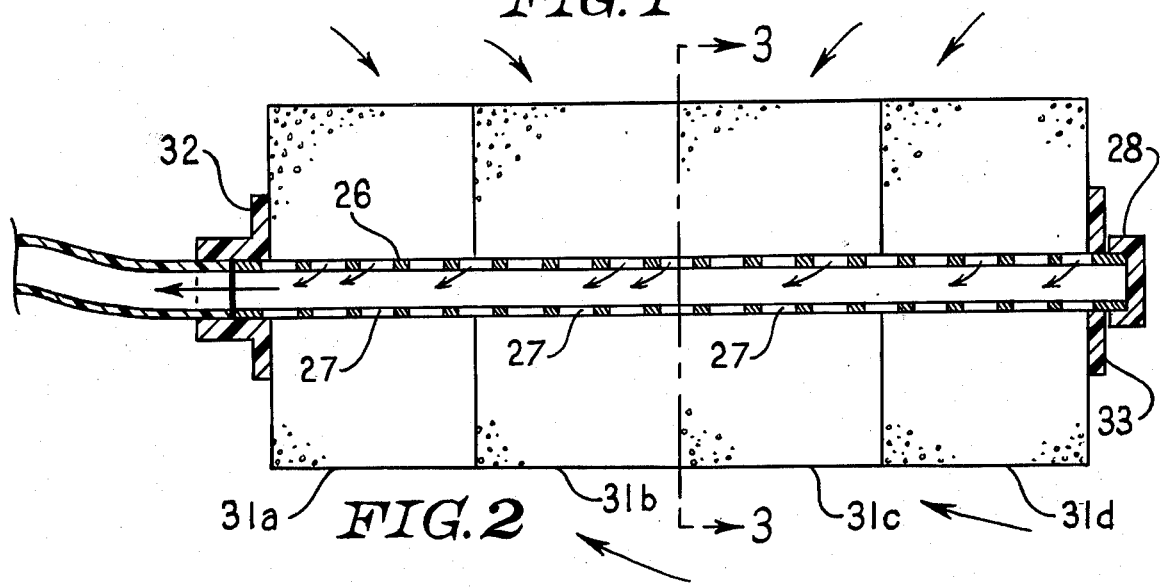
FIG. 2 is a central longitudinal section of a filter structure in accordance with the present invention.
Figure 3:
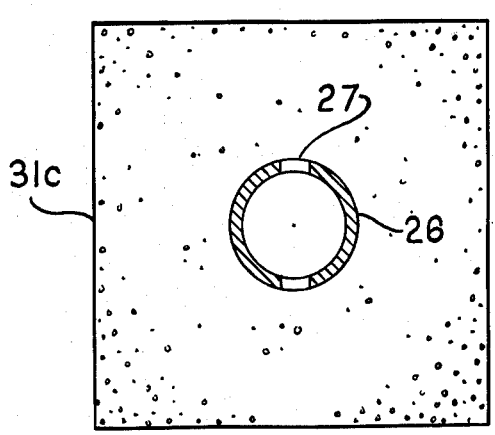
FIG. 3 is a transverse sectional view taken in the plane 3—3 of FIG. 2.
Figure 4:
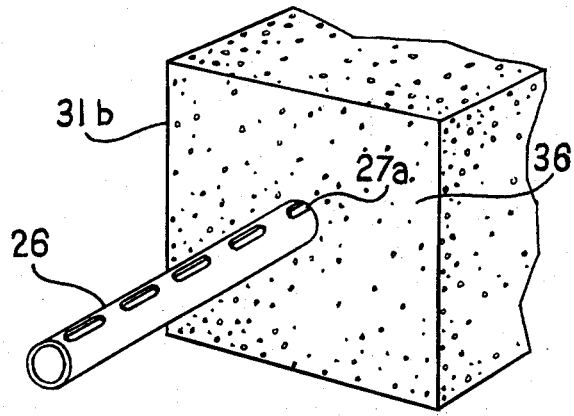
FIG. 4 is a partial perspective view of the filter of the present invention with a filter piece removed to show the relationship of pipe aperture and filter piece edge.

Considering now the structure of the present invention and referring to FIGS. 2 to 4, there will be seen to be provided a central pipe 26 having lateral apertures 27 therethrough disposed longitudinally thereof and a cap or the like 28 closing one end thereof. The other end of the apertured pipe 26 is connected to the inlet means 19 of the pump 13. Suitable conventional connections 29 are provided for removably connecting the filter 21 to the inlet hose 19 of the pump.

The filtering medium of the present invention is comprised of a plurality of separate pieces 31a, 31b, etc., of dimensionally stable flexible cellular pieces which are centrally apertured to fit about the pipe 26 in contiguous relation to each other. These filter pieces 31 may be formed of open cell foamed rubber, for example, and may have the shape of cubes although such shape is entirely optional. The filter pieces 31 may be maintained in contiguous relation about the central pipe 26 by end plates 32 and 33 disposed about the pipe 26 at opposite ends of the filter medium.

As previously noted, the present invention not only provides an advantageous filter structure for removal of physical particles from liquid drawn therethrough but also provides a unique structure for the protection of a suction pump employed for drawing liquid through the filter. The foregoing is herein accomplished by dimensioning and locating the filter pieces 31 about the pipe 26 so that the contiguous end surfaces of the filter pieces are aligned with apertures 27 in the pipe 26. The foregoing relationship is best shown in FIG. 4 wherein a filter piece 31 is illustrated as having a front face 36 thereof aligned with aperture 27a in the central pipe 26. It will be seen from this illustration that the edges of the filter pieces, or at least some of these edges are aligned with pipe apertures. This alignment of the openings or apertures of the central pipe with the contiguous edges of the filter pieces allows water to be drawn into the pipe between the filter pieces under circumstances wherein the filter pieces become so clogged with filtered material that water may not be readily drawn therethrough. The partially flexible nature of the filter pieces allows these pieces to flex at their contiguous edges when the bulk of the filtering material exhibits a sufficiently high resistance to fluid flow therethrough.

Further with regard to the nature of the filter pieces employed in the present invention, it is noted that same are herein defined as being dimensionally stable. By this terminology it is intended to define these filter pieces or blocks as requiring no support or confinement to maintain their original configuration. Consequently, the filter pieces or blocks may be placed about the apertured pipe rather than requiring an apertured container about the filter pieces. The resiliently flexible nature of the filter pieces is additionally advantageous in cleaning of these pieces. As noted above, the individual filter pieces are centrally apertured to tightly fit about the pipe 26 and are held in position by end plates 32 and 33 thereon. With the filter blocks about the central pipe, it is possible to determine the necessity for cleaning the filter merely by viewing it inasmuch as the filter material is exterior of the filtering device. Cleaning of the filter blocks is readily accomplished by removing the filter from the pool and slipping the blocks off the pipe. The blocks may then be washed and squeezed like a sponge to rapidly remove the entrapped particles such as algae and the like which have been filtered from the pond. It is convenient to provide the inlet hose 19 of the pump of sufficient length that the filter may be readily raised from the bottom of the fish pond and laid alongside the pond for cleaning of the filter. While it is not absolutely necessary to remove the filter blocks for cleaning, it is preferable to do so in order not to force filtered material into the pipe with the blocks are resiliently compressed and released during washing thereof. After the filter has been cleaned, as described above, it is only necessary to replace the filter blocks on th pipe and to toss the filter back into the pond where it will slowly sink as the cells of the filtering material fill with water.

In use the present invention is operated as is any other inlet filter to a pump in a pond or the like. It is only necessary to energize the pump motor 16 to operate the pump which, as shown, rests on the bottom of the pond or may be supported above the bottom by an appropriate support structure if desired. Water is drawn into the central pipe of the filter through the filter blocks by the suction of the pump so that the water is filtered in passage through the device hereof. This filtered water then passes through the pump and is discharged back into the pond via the pump outlet hose or pipe 18. Commonly a fish pond filter is operated upon some regular schedule such as a certain number of minutes per day or per week depending upon the ambient atmosphere and temperature. Commonly algae grow rather rapidly in fish ponds and consequently filters employed in fish ponds tend to become rapidly choked or clogged with such algae that are filtered from the water. Although proper operation of any filtering system calls for periodic maintenance wherein the filtering material is cleaned or replaced, it is an established fact that such maintenance is often sadly lacking in applications such as fish ponds. Under the circumstances wherein the filter blocks 31 of the present invention become choked or the cells thereof filled with impurities filtered from the water, it would normally be expected that the pump 13 would have increasing difficulty in drawing water into the pumps of the filter. This does, in fact, occur up to a certain point with the present invention; however, the structure of the present invention allows water to be drawn into the pipe aperture 27 between the filter blocks under those circumstances wherein maintenance has been insufficient to prevent clogging of the filtering material. Consequently, the present invention precludes the condition wherein the pump 13 might be operated with no inlet fluid. This safety feature of the present invention is highly advantageous in preventing pump damage and additionally will be seen to be provided very simply and without the addition of costly more complicated automatic bypass means for the filter. The filter itself provides the structure whereby a continuous flow of fluid such as water to the pump is ensured. There is thus provided by the present invention a very simple filter structure which is highly advantageous for many applications including the filtering of water in fish ponds, and it is noted that the filter also prevents tiny fish from being drawn into the pump impeller. It is, of course, possible to employ a plurality of filters "in parallel" with a single pump by the use of a "T" connection or the like to increase the period of effective filtering between cleanings.

Although the present invention has been described above with respect to a particular preferred embodiment of the invention, it will be appreciated by those skilled in the art that modifications and variations are possible within the scope of this invention. It is not intended to limit the present invention to the precise terms of description nor details of illustration.

What is claimed is:

1. An improved filtering device comprising
   a laterally apertured pipe having one end thereof closed and the other end thereof adapted for connection to the inlet of a suction pump,
   a plurality of filter pieces of centrally apertured dimensionally stable and resiliently flexible porous material disposed about said apertured pipe with said pipe extending through the central aperture of each piece and said filter pieces being disposed in contiguous relation about all of the lateral apertures of said pipe,
   means retaining said filter pieces in position about said pipe, and
   the separation of apertures in said central pipe being related to the dimensions and positions of said filtering pieces about said pipe so that at least some of the contiguous edges of filter pieces are aligned with lateral apertures in said pipe whereby liquid may be drawn into said pipe between said filter pieces as the filter becomes clogged.

2. The filtering device of claim 1 further defined by said filtering pieces each comprising an integral resilient open cellular material.

3. The filtering device of claim 1 further defined by said filtering pieces comprising foamed rubber.

* * * * *